(12) United States Patent
Satpathy

(10) Patent No.: US 9,843,473 B2
(45) Date of Patent: Dec. 12, 2017

(54) BACKHAUL FAULT ANALYSIS FOR FEMTO NETWORK

(71) Applicant: T-Mobile USA, Inc., Bellevue, WA (US)

(72) Inventor: Suchit Satpathy, Hackettstown, NJ (US)

(73) Assignee: T-Mobile USA, Inc., Bellevue, WA (US)

( * ) Notice: Subject to any disclaimer, the term of this patent is extended or adjusted under 35 U.S.C. 154(b) by 95 days.

(21) Appl. No.: 15/076,229

(22) Filed: Mar. 21, 2016

(65) Prior Publication Data

US 2017/0180188 A1 Jun. 22, 2017

Related U.S. Application Data

(60) Provisional application No. 62/271,201, filed on Dec. 22, 2015.

(51) Int. Cl.
*H04L 12/24* (2006.01)
*H04W 4/00* (2009.01)
*H04W 84/04* (2009.01)

(52) U.S. Cl.
CPC .......... *H04L 41/0654* (2013.01); *H04L 41/22* (2013.01); *H04W 4/008* (2013.01); *H04W 84/045* (2013.01)

(58) Field of Classification Search
CPC .... H04L 41/0654; H04L 41/22; H04W 4/008; H04W 84/045
See application file for complete search history.

(56) References Cited

U.S. PATENT DOCUMENTS

| | | | | |
|---|---|---|---|---|
| 2009/0286509 A1* | 11/2009 | Huber | ............... | G06Q 20/1235 455/410 |
| 2010/0151858 A1* | 6/2010 | Brisebois | ............. | H04W 24/10 455/434 |
| 2012/0127975 A1* | 5/2012 | Yang | .................... | H04W 12/06 370/338 |
| 2012/0238268 A1* | 9/2012 | Radulescu | ........ | H04W 36/0061 455/435.1 |
| 2013/0079003 A1* | 3/2013 | Nagaraja | .............. | H04W 24/02 455/435.1 |
| 2013/0150027 A1* | 6/2013 | Leclercq | .............. | H04W 4/021 455/427 |
| 2014/0177434 A1* | 6/2014 | Cartmell | ............ | H04L 41/0668 370/221 |
| 2015/0373577 A1* | 12/2015 | Yang | ................ | H04W 72/0413 455/435.1 |
| 2016/0007225 A1* | 1/2016 | Liu | ................... | H04W 36/0022 370/237 |

* cited by examiner

*Primary Examiner* — Brian D Nguyen
(74) *Attorney, Agent, or Firm* — Lee & Hayes, PLLC

(57) ABSTRACT

Described herein are systems and methods for determining IP backhaul issues in a femtocell network. A fault analysis tool retrieves log files from various components within the femtocell network and, using programmed logic, parses the log files and determines whether it is likely that an issue exists with the IP backhaul that prevents the femtocell network from communicating with the network of a wireless carrier. Additional automated tools are able to identify issues within the femtocell network and send instructions to one or more components in the femtocell network to correct the issues.

19 Claims, 7 Drawing Sheets

BACKHAUL FAULT ANALYSIS FOR FEMTO NETWORK

CROSS-REFERENCE TO RELATED APPLICATIONS

This application claims priority to provisional application 62/271,201 filed on Dec. 22, 2015 which is incorporated herein by reference in its entirety.

BACKGROUND

The increasing use of wireless communication devices has led to a corresponding increase in the wireless carrier infrastructure necessary to support the wireless communication devices. The wireless carrier infrastructure, while far reaching, may not provide robust and reliable service to all locations. For example, macro cell coverage may provide wireless cellular service to a city or a metropolis; however, there are various factors that can influence the reliability of the available coverage. For example, signal strength may be influenced by factors such as the proximity to a macro cell tower, radio frequency interference, or line of sight obstructions such as buildings or geographic terrain.

One approach to increasing the quality of service (QoS) to locations where the wireless carrier signal strength can be improved is the installation of a femtocell. A femto base station is a low power base station transceiver that is typically installed indoors and is connected to the Internet by cable, DSL, fiber optic link, or other suitable IP backhaul technology. This connection allows the femto base station to connect to the wireless carrier core network and provide service to wireless communication devices registered with the femto base station to create a femtocell.

A femtocell is a geographic area served over a single carrier or channel by a femto base station. Generally, a femtocell may be established within a subscriber's home. The subscriber may use the femtocell to connect a variety of wireless devices to the femto base station using short range wireless technology.

The femtocell may be set up by the user and configured to connect to the wireless carrier home network through the subscriber's Internet Service Provider ("ISP") broadband Internet connection. There are numerous nodes within this relatively complex network configuration, and an issue with any of these nodes may disrupt the subscriber's ability to connect to the home network provided by the wireless carrier. Troubleshooting the nodes within the telecommunications network architecture may prove time-consuming and frustrating, especially for a subscriber who has established their own femtocell and does not have expertise at diagnosing communication issues within a complex network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
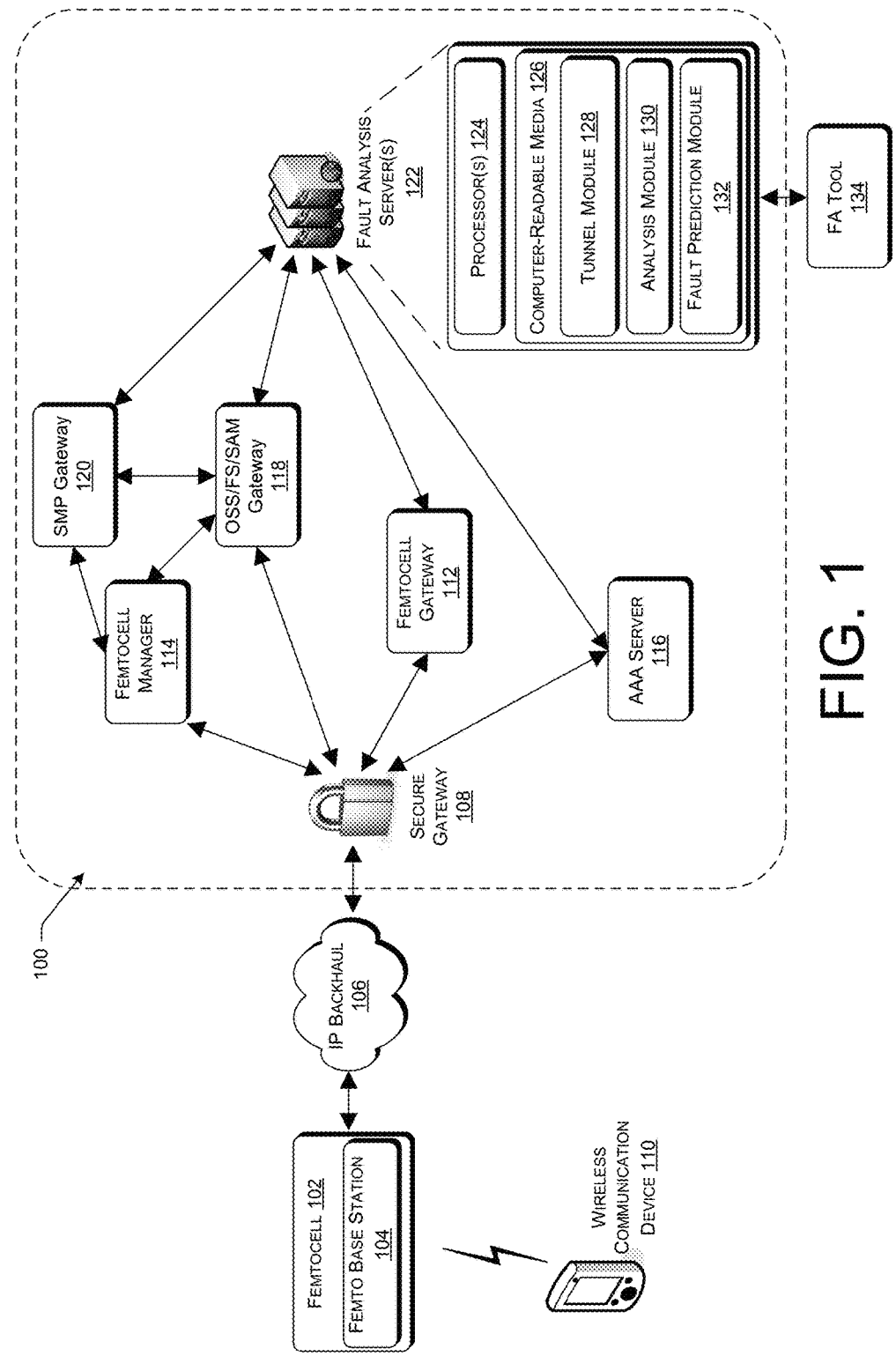
FIG. 1 illustrates an overview of a wireless communication system.

This disclosure describes, in part, systems, methods, and tools for improving the reliability of a femtocell network and identifying and resolving networking issues within the femtocell. The systems and methods may include diagnostic tools and programmed logic to quickly aid in identifying the one or more nodes that may prevent a reliable connection, including identifying faults with the backhaul technology.

The initial activation of a femto base station can be problematic, especially where the subscriber's backhaul is not suitable for the femtocell network. However, troubleshooting issues that prevent the femtocell from initializing can be very time-consuming and frustrating, especially for a subscriber who is not a network engineer. For example, oftentimes a subscriber may be required to make a change within the configuration of a femto base station and be required to wait several hours to learn whether the change had the desired effect. Within a complex network, such as the femtocell network, troubleshooting each node within the network can be quite difficult and time-consuming. One embodiment results in a fault analysis tool that is able to quickly and efficiently retrieve and parse a multitude of log files to quickly ascertain whether the backhaul is the likely culprit, in which case, the wireless carrier may not need to further troubleshoot the issues since it has no ability to manage the backhaul hardware or settings.

According to some embodiments, a method for predicting IP backhaul issues in a femtocell network is disclosed in which the method comprises, as an initial determination, determining that a fault exists in the femtocell network. Indicia may be received that include femto device provisioning data indicating that a femto device was provisioned. Additionally, tunnel data indicating a list of tunnels initiated by the femto device along with femto manager provisioning data indicating that a femto manager was provisioned may be provided. Service management platform (SMP) gateway provisioning data indicating that an SMP gateway or other required provisioning such as SAM, FGW, and AAA etc. was provisioned is also received and the provisioning data is analyzed. Specifically, the method includes analyzing the tunnel data, femto device provisioning data, femto manager provisioning data, and additional provisioning data and determining that the fault in the femtocell network is with an IP backhaul.

A method for predicting IP backhaul issues may further include receiving a unique identifier of the femtocell device. The identifier may be a serial number or some other unique identifier. Additionally, the tunnel data may include a tunnel array provided by an authentication, authorization, and accounting (AAA) server and the method may further include removing tunnel data older than a predetermined threshold to result in recent tunnel data. The recent tunnel data may include the most recent twenty-four hours of tunnel data, forty-eight hours of tunnel data, or tunnel data for some other desired timeframe.

The method may further include determining that there is no active tunnel, and determining that the fault in the femtocell network is therefore with the IP backhaul. Alternatively, the method may further include determining that the fault in the femtocell network is with the IP backhaul based upon determining that there are no faults with the femto device provisioning, femto manager provisioning, or the SMP gateway provisioning.

Moreover, the method for predicting IP backhaul issues may indicate that the list of tunnels initiated by the femto device includes more than one boot tunnel, and determining that the fault in the femtocell network is with the IP backhaul is based at least in part upon the number of boot tunnels being above a threshold. For example, if it is determined that there are greater than twenty boot tunnels, this is an indicator that there is a fault within the femtocell network that is likely the result of an IP backhaul issue.

According to other embodiments, a non-transitory computer-readable medium may have executable instructions stored thereon that, when executed by a computing device, cause the computing device to receive femto base station data identifying a femto base station; receive tunnel data indicating one or more tunnels initiated by the femto base station; extract latest tunnel data by filtering the tunnel data based at least in part upon a time threshold; establish communication with a femtocell gateway and receive femtocell gateway provisioning data; establish communication with a femtocell manager and receive femtocell manager provisioning data; establish communication with a SMP gateway and receive SMP gateway provisioning data; establish communication with a SAM and receive SAM provisioning data; execute a fault prediction module to analyze one or more of the latest tunnel data, the femtocell gateway provisioning data, the femtocell manager provisioning data, SAM provisioning data and the SMP gateway provisioning data; and determine that the fault is with an IP backhaul associated with the femto base station based at least in part upon a determination that the fault is not with the femto base station, the femtocell gateway, the femtocell manager, or the SMP gateway.

In other embodiments, the fault with the IP backhaul is determined, at least in part upon a determination that the latest tunnel data indicates that there is not an active tunnel. The absence of an active tunnel for the femtocell to communicate through is an indicator that there is an issue with the IP backhaul, especially in those embodiments where it is determined that the other components within the femtocell network have been successfully provisioned.

In some instances, IP backhaul is determined to have issues where the latest tunnel data indicates that a number of boot tunnels is above a threshold. For example, where there are over twenty boot tunnels, this indicates that there is problem with the femtocell communication through the IP backhaul.

In other embodiments, the fault with the IP backhaul is determined, at least in part upon a determination that the tunnel data indicates a serving tunnel initiated by the femto base station, but the serving tunnel is no longer active. An initial serving tunnel indicates that the femtocell was once active and properly provisioned; however, the subsequent lack of an active service tunnel indicates a communication issue, such as with the IP backhaul or that the femto device may have lost power or is otherwise switched off.

In some instances, a graphical user interface is provided and configured to receive an identification of a femto base station through a user input to the graphical user interface. Moreover, the graphical user interface can be used to display information indicating that the fault is with the IP backhaul, or the issue is likely with another component in the femtocell network.

In some instances, the fault with the IP backhaul is determined, based at least in part, upon a determination that a serving tunnel was initiated, and the SMP gateway was provisioned.

According to other embodiments, a system is provided which includes memory, one or more processors, a tunnel module stored on the memory and executable by the one or more processors to receive tunneling data indicating tunnels established by a femto base station within a femtocell network, an analysis module stored on the memory and executable by the one or more processors to analyze the tunneling data, a fault prediction module stored on the memory and executable by the one or more processors to parse the tunneling data to determine a fault preventing the femto base station from communication with a wireless carrier network.

The system may categorize the tunnel data to identify boot tunnel data, init tunnel data, and serve tunnel data. In some instances, the tunnel data may further be filtered based upon a predetermined time period, such as, for example, the most recent eight hours, twenty-four hours, or forty-eight hours, or some other desired time period.

The fault prediction module may be executable by the one or more processors to determine that the fault is caused by an IP backhaul associated with the femto base station. This may be accomplished, for example, upon a determination that the tunneling data indicates there are no tunnels. Moreover, it may be accomplished upon a determination that the tunneling data indicates a number of boot tunnels exceeding a threshold number of boot tunnels. Alternatively, it may be accomplished upon a determination that a serving tunnel has been established and that an SMP gateway has been provisioned.

FIG. 1 illustrates an overview of a wireless communication system. A wireless carrier 100 may provision one or more femtocells 104 to expand the available network, especially to areas that are indoors or on the cell edge. A femtocell 102 generally includes a small, low-powered cellular femto base station 104 that is usually deployed in a home or a small business. For purposes of this disclosure, the method, systems, and techniques described herein will apply to a wide variety of small cells, of which a femtocell is a subset. However, as an exemplary implementation and embodiment, a femtocell will be used throughout this description, although the description should not be limited to a femtocell.

The femtocell 102 connects to the wireless carrier 100 through an IP backhaul 106. The IP backhaul 106 may be a broadband connection that may provide any suitable connection to the Internet, such as DSL, cable, fiber optic, satellite, or any other suitable broadband connection to the Internet and is provided by the subscriber's internet service provider ("ISP").

The femtocell 102 allows the wireless carrier 100 to extend service coverage in a residential setting or inside the location of a small business and, in some instances, will allow up to eight, up to 10, or up to 16 or more cellular devices to connect to the femtocell 102. The femtocell 102 may be used in conjunction with any applicable cellular standard, such as GSM, WCDMA, CDMA2000, TD-SCDMA, WiMAX, and LTE to name a few examples.

In some embodiments, such as embodiments that utilize 3GPP technology, the femtocell 102 provides a Home Node B ("HNB"). In other embodiments, such as those employing LTE technology, the femtocell 102 provides a Home eNode B ("HeNB").

The femtocell 102 connects to the Internet through the IP backhaul 106 and communicates through a security gateway 108 to various endpoints, such as the core network of the wireless carrier 100. In many implementations, the security gateway 108 is a high-density Internet Protocol Security ("IPSec") Gateway and allows the femtocell 102 to create secure tunnels with the wireless carrier 100 or other outside endpoints to deliver all voice, messaging, and packet data services between the femtocell 102 and the core network of the wireless carrier 100.

In various implementations, the wireless carrier 100 may incorporate any one or more base stations, node Bs, eNode Bs, or wireless access points (e.g., Wi-Fi access points, WiMax access points, etc.). The wireless carrier 100 may include components fixing the wireless carrier 100 to a location and positioning the wireless carrier 100 at that location, such as components of a cell tower. The wireless carrier 100 may also support one or more additional cells of varying sizes, such as macrocells, microcells, picocells, femtocells, or other small cells, of one or more access networks of a telecommunication network. To provide wireless connectivity to the telecommunication network, the wireless carrier 100 may be equipped with any number of components, such as radio antennas, transmitter components, receiver components, power amplifiers, combiners, duplexers, encoder components, decoder components, band pass filters, power sources, or control components. The wireless carrier 100 may also include one or more carrier servers, such as a server or server farm, multiple, distributed server farms, a mainframe, a work station, a personal computer (PC), a laptop computer, a tablet computer, an embedded system, or any other sort of device or devices.

In further implementations, the wireless carrier 100 may transmit and receive over multiple frequency bands. Examples of such frequency bands may include a licensed frequency band, an unlicensed frequency band, a semi-licensed frequency band, an overlapped frequency band, a cellular frequency band, an AWS frequency band, a 700 MHz frequency band (e.g., band 12), an 800 MHz frequency band, a 900 MHz frequency band, a PCS frequency band, an 1800 MHz frequency band, a 1900 MHz frequency band, a 4.9 GHz frequency band, a GSM frequency band, a 2.4 GHz frequency band, a 5.0 GHz frequency band, a 5.8 GHz frequency band, a 3.65 GHz frequency band, a UWB frequency band, a frequency band in a range from 3.1-10.6 GHz, a 3G frequency band, a WCS frequency band, a MMDS frequency band, or a WiMax frequency band In some implementations, the telecommunication network which includes the wireless carrier 100 may include multiple other wireless carriers 100 associated with multiple other access networks (visited networks), ensuring continued coverage as the wireless communication device moves from location to location. The telecommunication network may implement the home network as, for example, a System Architecture Evolution (SAE) home network, a General Packet Radio Service (GPRS) home network, or any other sort of home network. The home network may include a gateway GPRS support node (GGSN), a serving GPRS support node (SGSN), a mobile switching center (MSC), a home location register (HLR), a visitor location register (VLR), a mobility management entity (MME), a serving gateway (SGW), a packet data network gateway—also referred to as a packet gateway (PGW), a home subscriber server (HSS), or an evolved packet data gateway (ePDG).

The access network(s) and home network of the telecommunication network may associated with any one or more access technologies, such as 2G, 3G, 4G, 5G, GSM, CDMA, UMTS, HSPA, HSPA+, LTE, LTE-Advanced, Wi-Fi, or WiMax.

In any event, the femtocell 102 is able to communicate with the wireless carrier 100 network by first accessing the IP backhaul 106 provided by the subscriber's ISP. The security gateway 108 allows bi-directional secure communication between the wireless carrier 100 network and the femtocell 102. That is, a wireless communication device 110 may wirelessly connect to the femtocell 102 and send voice, messaging, and packet data to the network of the wireless carrier 100.

In various implementations, a wireless communication device 110 may be any sort of computing device known in the art that is capable of communicating over one or more frequency bands. Examples of wireless communication devices 110 include a PC, a laptop computer, a server, a server farm(s), a mainframe, a tablet computer, a work station, a telecommunication device, a smartphone, a cell phone, a personal digital assistant (PDA), a media player, a media center device, a personal video recorder (PVR), a television, an electronic book reader, a set-top box, a camera, a video game console, a kiosk, a gaming device, processor(s), integrated components for inclusion in a computing device, an appliance, an electronic device for inclusion in vehicles, a gaming device, or any other sort of device.

A femtocell gateway 124 aggregates traffic from multiple femtocells 104 and allows data transmission with the core network of the wireless carrier 100. In some implementations, the femtocell gateway 124 aggregates and validates signaling traffic, interfaces with the femtocell 102 for authentication, and handshakes with the core network of the wireless carrier 100.

A femtocell manager 126 communicates with the femtocell 102 to ensure the femtocell 102 has the latest software and firmware updates and is able to conduct diagnostic checks. Any changes that are needed to be performed to the femtocell 102 may be managed and implemented through the femtocell manager 126. For example, the OSS/FS Gateway 118 may communicate with the femtocell manager 114 and instruct the femtocell manger 114 to install or update software, provision the femto base station 104, update parameters, reboot the femto base station 104, or some other series of actions. The femto cell manager uses the TR-69 communication protocol when communicating to the femto base station 104. Working in conjunction with the OSS/FS Gateway 118 may be a service aware manager (SAM) that tracks that service status of the femtocell 102 and maintains its own provisioning data which may be used to troubleshoot possible communication or provisioning errors with the femtocell 102.

An authentication, authorization, and accounting server (AAA server) 116 is managed by the wireless carrier 100 and ensures that the femtocell 102 provides the necessary credentials in order to access the core network of the wireless carrier 100. The AAA server 116 maintains log files of the interactions with the femtocell 102, which can be later accessed for troubleshooting purposes.

An Operations Support Systems and File Server (OSS/FS) Gateway 118 may be in communication with the femtocell 102 and may support management functions, such as, for example, network inventory, network configuration, fault management, and service provisioning, among others. A Service Management Platform (SMP) Gateway 120 may be in communication with the OSS/FS gateway 118 and provide management support for the administration of the femtocell 102 as well as proving provisioning data.

A Fault Analysis server (FA server) 122 may be in communication with one or more gateways or servers. For example, the FA server 122 may communicate with the femtocell gateway 124, femtocell manager 126, AAA server 116, OSS/FS/SAM gateway 118, and the SMP gateway 120. The FA server 122 may also include a web server to allow for web data to be sent and received and to provide an interface for one or more web clients.

The FA server may have one or more processors 124 and computer-readable storage media 126. The computer-readable storage media 126 is non-transitory and may store various instructions, routines, operations, and modules that, when executed, cause the processors to perform various activities. In some implementations, the one or more processors 124 are central processor units (CPU), graphics processing units (GPU) or both CPU and GPU, or any other sort of processing unit. The non-transitory computer-readable storage media 126 may include volatile and nonvolatile, removable and non-removable tangible, physical media implemented in technology for storage of information, such as computer readable instructions, data structures, program modules, or other data. System memory, removable storage, and non-removable storage are all examples of non-transitory computer-readable media. Non-transitory computer-readable storage media 126 may include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the FA server 122.

As illustrated in FIG. 1, the computer-readable storage medium 126 of the FA server 122 maintains various modules, such as a tunnel module 128, an analysis module 130, and a fault prediction module 132. Of course, other modules may be included and may be configured with instructions to carry out various other tasks not further described herein. A fault analysis tool (FA tool) 134 may be in communication with the FA server 122 and may provide an interface to access the described modules, routines, and data.

The FA server 122 may be configured to send and receive data communications with one or more other components that make up the core network of the wireless carrier 100. For example, the FA server 122 may establish communication with one or more of the femtocell manager 114, the femtocell gateway 112, the AAA server 116, the OSS/FS/SAM gateway 118, or the SMP gateway 120 to retrieve information related to the femtocell 102 to the femtocell gateway 112 such as log files, tunneling data, provisioning data, and other useful information.

A femtocell 102 is typically established within a subscriber's home or business by connecting a femto base station 104 to a broadband internet connection provided in the home of the subscriber. The broadband internet connection is provided by an ISP, which in many cases, is provided by an entity separate from the wireless carrier 100. The femto base station 104 may be a plug and play device requiring no action from the subscriber other than connecting it to a power source, and connecting it to the broadband source, such as a modem or router. To this end, the femto base station 104 may be provisioned or partially provisioned prior to delivery to the subscriber, and once the subscriber connects the femto base station 104 to a power source and a broadband connection, the femto base station 104 may contact one or more provisioning servers, such as the femtocell manager 114 and the AAA server 116. These servers may provide software to the femto base station 104 and may further configure the femto base station 104 to access the core network of the wireless carrier 100.

Of course, in order to properly provision the femto base station 104, it must be connected to the Internet through the IP backhaul 106 provided by the ISP of the subscriber. Any issues with the IP backhaul 106 will prevent the femto base station 104 from connecting with the wireless carrier 102, and will not be visible to the wireless carrier 100, but rather, will need to be addressed by the subscriber and the ISP.

In some instances, the femtocell 102 will contact servers of the wireless carrier 100, such as the AAA server 116 and the femtocell manager 114, to authenticate that it has the necessary permissions and protocols to send and receive voice and data communication over the network of the wireless carrier 100. The femtocell manager 114 and the AAA server 116 will maintain log files of the interactions with the femto base station 104 and will identify the femto base station 104 by a unique identifier, such as a serial number associated with the femto base station 104. By using a unique identifier, the log files can be used to identify a specific femto base station 104 and its interaction with the various components of the core network of the wireless carrier 100.

For example, the femto base station 104 may create an initialization log (init log) as it is powered on and connects to the wireless carrier 100. There may also be a boot log created as the femto base station 104 boots and records the events that occur during the boot process. The boot log may be sent to the AAA server 116.

Additionally, a serving log may be created that records events associated with data flow to and from the femtocell 102. One aspect of the log files may be the inclusion of tunnel arrays. In some instances, boot tunnel arrays, init tunnel arrays, and serving tunnel arrays may be created and stored on the AAA server 116. In addition, provisioning logs may be maintained and can be retrieved through the OSS/FS Gateway 118, the SMP Gateway 120, or some other node.

Figure 2:
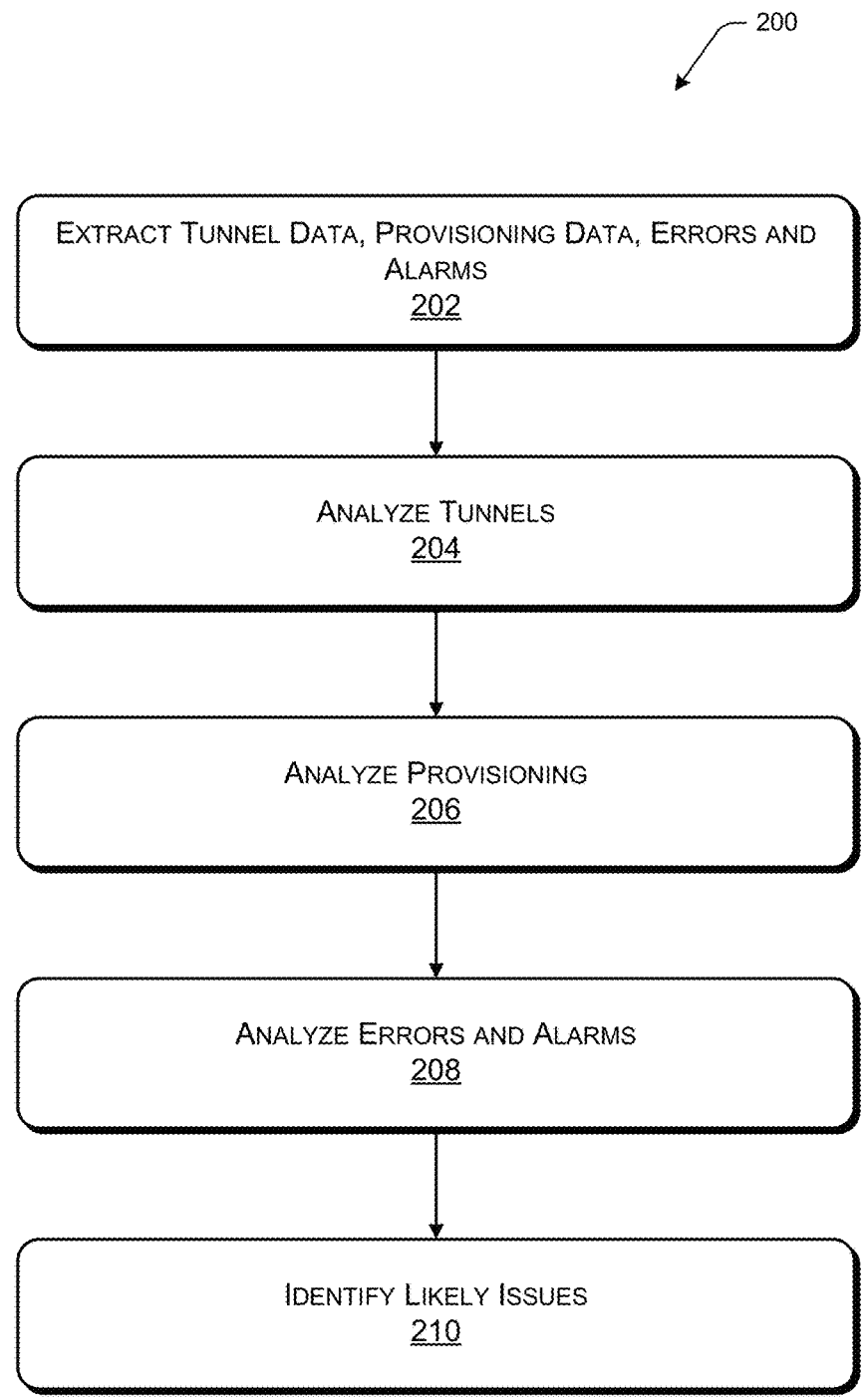
FIG. 2 illustrates an overview of diagnosing femtocell network issues.
Figure 3:
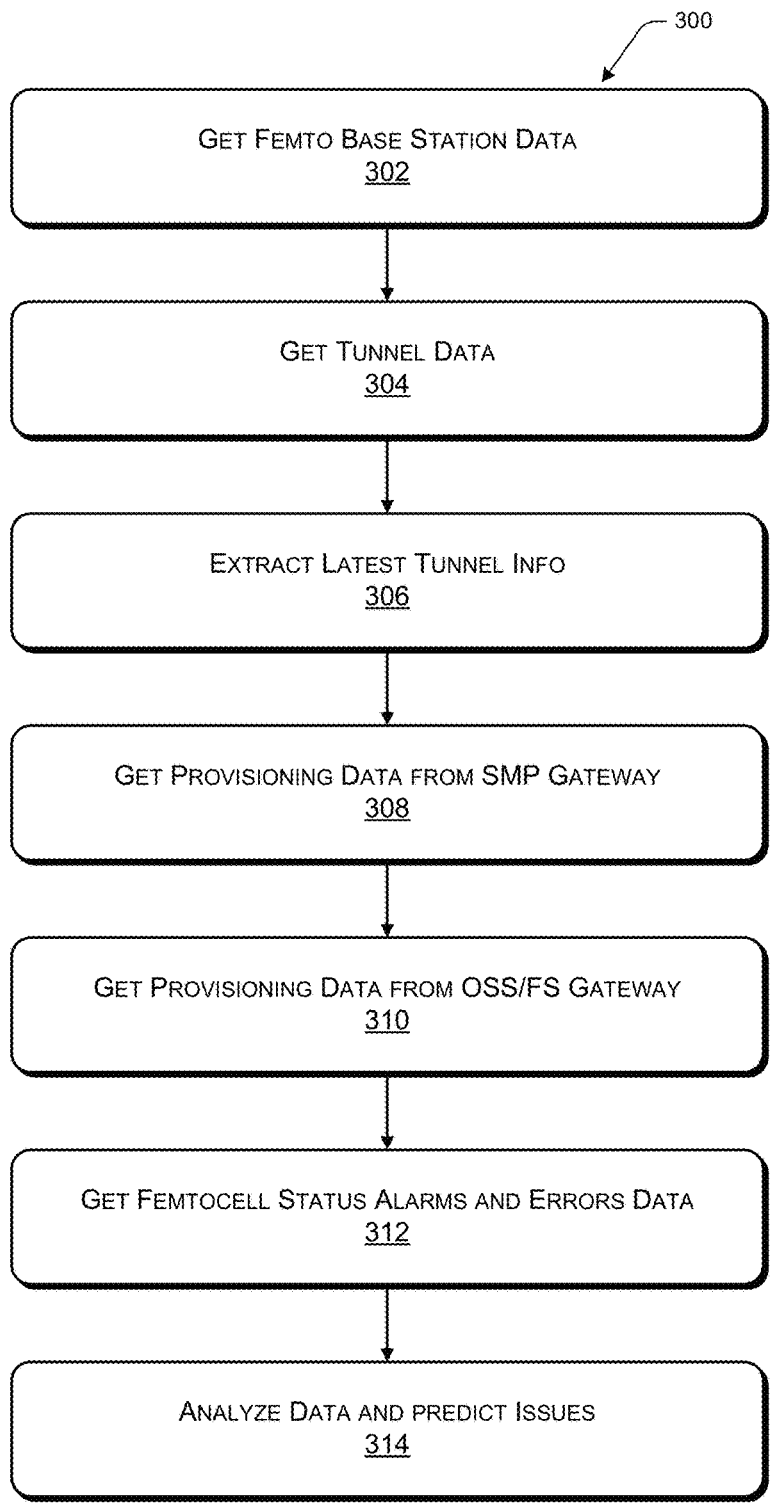
FIG. 3 illustrates a logical flow for diagnosing femtocell network issues.

FIGS. 2 and 3 are flow diagrams showing illustrative routines for identifying and predicting faults within the femtocell telecommunications network. It should be appreciated that the logical operations described herein with respect to FIGS. 2 and 3 are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, in special purpose hardware, and any combination thereof. It should also be appreciated that more or fewer operations may be performed than shown in the figures and described herein. These operations may also be performed in parallel, or in a different order than those described herein.

FIG. 2 illustrates an example process for predicting faults by the FA server 122. At block 202, the FA server 122 collects and builds tunnel array data, provisioning data, and errors and alarms data. The FA server 122 may request the tunnel data from one or more log files stored on the AAA server 116. The request may be time-bound, such as a request for the past 48 hours, or the past 24 hours, or the most recent 12-hour or 4-hour periods. The tunnel array data may be requested for a specific femtocell 102, such as by including the serial number of the femto base station 104 of interest with the request. In some instances, the FA server 122 sends a request to the AAA server 116 that includes the serial number of a specific femto base station 104 and requests the log files, such as a boot log, an init log, and a serving log. The log files are returned to the FA server 122 for analysis of the tunnel array data.

The FA server 122 may request the provisioning data from the SNIP Gateway 120, from the OSS/FS Gateway 118, or from a combination of both gateways. The FA server 122 may request the errors and alarms data from the femtocell manager 114, the OSS/FS/SAM Gateway 118, or a combination.

The tunnel array data is analyzed at block 204, where extraneous information may be filtered out, or may be reorganized to a format that makes processing the tunnel array data more efficient. The tunnel array data may contain data that indicates an identity of the tunnels that are created, a timestamp indicating when the tunnels were created, packet information indicating the size and type of data packets being sent and/or received, and the endpoints of the tunnels. The tunnel array data may be analyzed in order to identify any immediate issues. For example, if the tunnel array data is devoid of any reported tunnels being initiated, this may be indicative of an issue with the femtocell 102 establishing an initial connection with the wireless carrier 100. This may indicate an issue, for example, with the IP backhaul 106 that prevents the femtocell 102 from connecting to the internet.

At block 206, the provisioning data is analyzed. As an initial matter, when the femtocell 102 is established, it must be provisioned in order to communicate with the wireless carrier 100. During this initial setup, provisioning data will be written to log files indicating that the femtocell 102 has been properly set up and is communicating with the wireless carrier 100. As an initial troubleshooting matter, the provisioning data in the log files is verified to ensure that the femtocell 102 was properly provisioned. If the provisioning data is missing, the logical step will be to attempt to provision the femtocell 102 again. This may be accomplished, for example, by sending instructions to the femto base station 104, or by instructing a user on how to provision the femto base station 104.

At block 208, the errors and alarms data is analyzed for possible failures. The errors and alarms data may include data relating to any issues with proper and complete provisioning, communication errors, or other information that may be related to improper setup or functioning of the femtocell 102.

At block 210, the log files are analyzed to identify likely issues, if any. Within a complex femtocell 102 communication network, there are numerous nodes that could be responsible for a myriad of issues that could result in communication failures with the femtocell 102. The log files may be analyzed to look for issues that could lead to communication failure. As described above, the lack of provisioning data in the log files is a key indicator that the femto base station 104 was not properly provisioned. An analysis of the tunneling data may also indicate failures, or likely failures, with certain nodes within the femtocell 102 communication network. For example, fault analysis logic may be programmed into a troubleshooting tool that is programmed with instructions designed to analyze the log data and identify possible issues with the femtocell 103.

FIG. 3 illustrates another, more detailed, example process for analyzing faults 300 by the FA server 122. The process 300 is illustrated as a logical flow graph, each operation of which represents a sequence of operations that can be implemented in hardware, software, or a combination thereof. In the context of software, the operations represent computer-executable instructions stored on one or more non-transitory computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. The processes may be performed by hardware, such as the hardware illustrated in the figures and described herein.

At block 302, data associated with the femto base station 104 is retrieved that may indicate a specific femto base station 104 to analyze. In some examples, this information is retrieved when a customer places a call to representatives of the wireless carrier to help get the femtocell 102 operating. In some instances, the subscriber provides an identification of the femto base station 104, such as by providing a serial number. The representatives of the wireless carrier may alternatively retrieve the serial number of the femto base station 104 based upon customer information, such as the customer's name, address, account number, social security number, or some other identifier that can be linked with the customer's profile, which may contain an identifier of the femto base station 104, such as the serial number associated with the femto base station 104. This information may be stored in a database and accessible to the representative of the wireless carrier.

At block 304, the tunnel data is retrieved. The retrieved tunnel data may be specific to the femto base station 104, or may include a large sample of tunnel data from multiple femto base stations 104, and can be filtered to include the tunnel data from the femto base station 104 of interest.

At block 306, the tunnel data may be filtered to, for example, focus only on the femto base station 104 of interest. Alternatively, the tunnel data may be filtered to extract only the most recent tunnel data. For example, a filtering routine may be executed to filter the tunnel data based upon a time stamp associated with the tunnel data. The tunnel data may be filtered, for example, to show only the most recent 4 hours of tunnel data, or the most recent day of tunnel data, or the most recent week of tunnel data, in order to determine a recent history of the tunnel data associated with the femto base station 104 as it connected to the wireless carrier 102. The most recent tunnel data may include any private or public IP addresses associated with the femto base station 104 and may additionally include the current tunnel data associated with the femto base station 104.

At block 308, the provisioning data is retrieved from the SMP gateway gateway 120. The SMP gateway 120 provisioning data may include data relating to the femto base station 104, such as a database having information stored therein related to the communication packets sent to and from the femto base station 104.

At block 310, the provisioning data is retrieved from the OSS/FS gateway 118. The OSS/FS gateway 118 provisioning data may indicate the communication between the femto base station 104 and the OSS/FS gateway 118, and may include data relating to the femto base station 104 having the proper provisioning and that the required nodes are functioning properly.

At block 312, the femtocell 102 status alarms and errors data is retrieved from the femtocell manager 114, the OSS/FS Gateway 118, the SNIP Gateway 120, or a combination of nodes that are in communication with the femtocell 102. The status alarms and errors data may indicate any failures or known errors with tunneling, provisioning, missing data, communication, or other errors that may affect performance of the femtocell 102 . . . .

At block 314, the provisioning data may be sorted, filtered, and analyzed to determine a likely node failure. For example, where the latest tunnel data indicates that there is no currently active tunnel, this may indicate that there is a problem with the IP backhaul 106. As another example, where there is an active tunnel indicated, and the femtocell gateway 112 provisioning data indicates that it has been properly provisioned, then the issue may be that the femto base station 104 is still being activated and there is no action to take other than to wait for the femto base station 104 to become active after final provisioning.

In some embodiments, fault analysis logic may be programmed into a troubleshooting tool that is programmed with instructions designed to analyze the provisioning log data and identify possible issues with the femtocell 102.

In some instances, the FA server 122 includes software written to provide a user interface to allow a representative of the wireless carrier, or the subscriber, to retrieve information regarding the femtocell 102 that may indicate a node where an issue lies that prevents communication between the femtocell 102 and the wireless carrier 100.

Specifically, the FA server 122 may contain software that provides a fault analysis tool. As described in relation to FIG. 1, the FA server 122 may have one or more processors 124 in communication with computer-readable memory 126. The computer-readable memory may have instructions stored thereon, that when executed by the one or more processors, cause the processors to perform various acts. The instructions may be stored in various modules, such as, a tunnel module 128, an analysis module 130, and a fault prediction module 132. Additional modules may be included to provide additional functionality and features to enhance the applicability and usability of the described FA tool 134. The FA tool 134 may provide a user interface to receive user input and provide detailed information to a user, including information related to possible fault predictions.

In some embodiments, the FA tool 134 comprises a web-based interface that allows a user to interact with the FA server 122 over an internet connection. The FA tool 134 may be written in any suitable language to allow a user to send and receive information to the FA server 122 in an effort to predict and/or diagnose faults within the femtocell 102 telecommunication system.

The FA tool 134 may be programmed with fault prediction logic that is configured to analyze data provided by the wireless carrier 100 to predict likely node failures. As an initial input, the FA tool 134 may be provided with a unique identifier of a femto base station 104 of interest, such as a serial number. Of course, other unique identifiers may be used, but for purposes of the described examples, a serial number associated with a femto base station 104 will be used.

The FA tool 134 can then retrieve the relevant log files and provisioning data associated with the femto base station 104 and apply a series of logical steps in order to analyze the log files and provisioning data to determine or predict a most logical node of failure.

Figure 4:
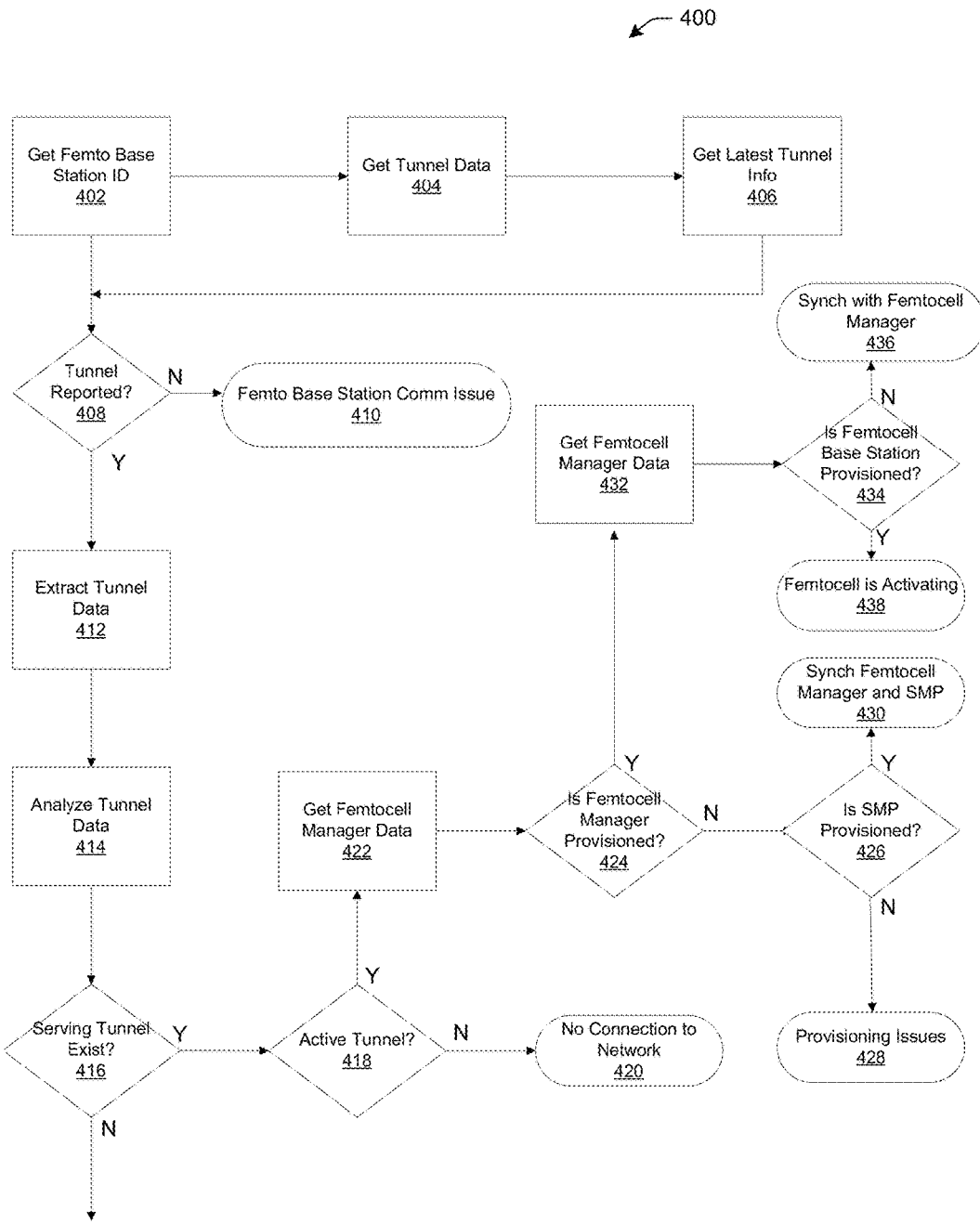
FIG. 4 illustrates a flow diagram as an example of a logic flow of a femtocell fault analysis tool.
Figure 5:
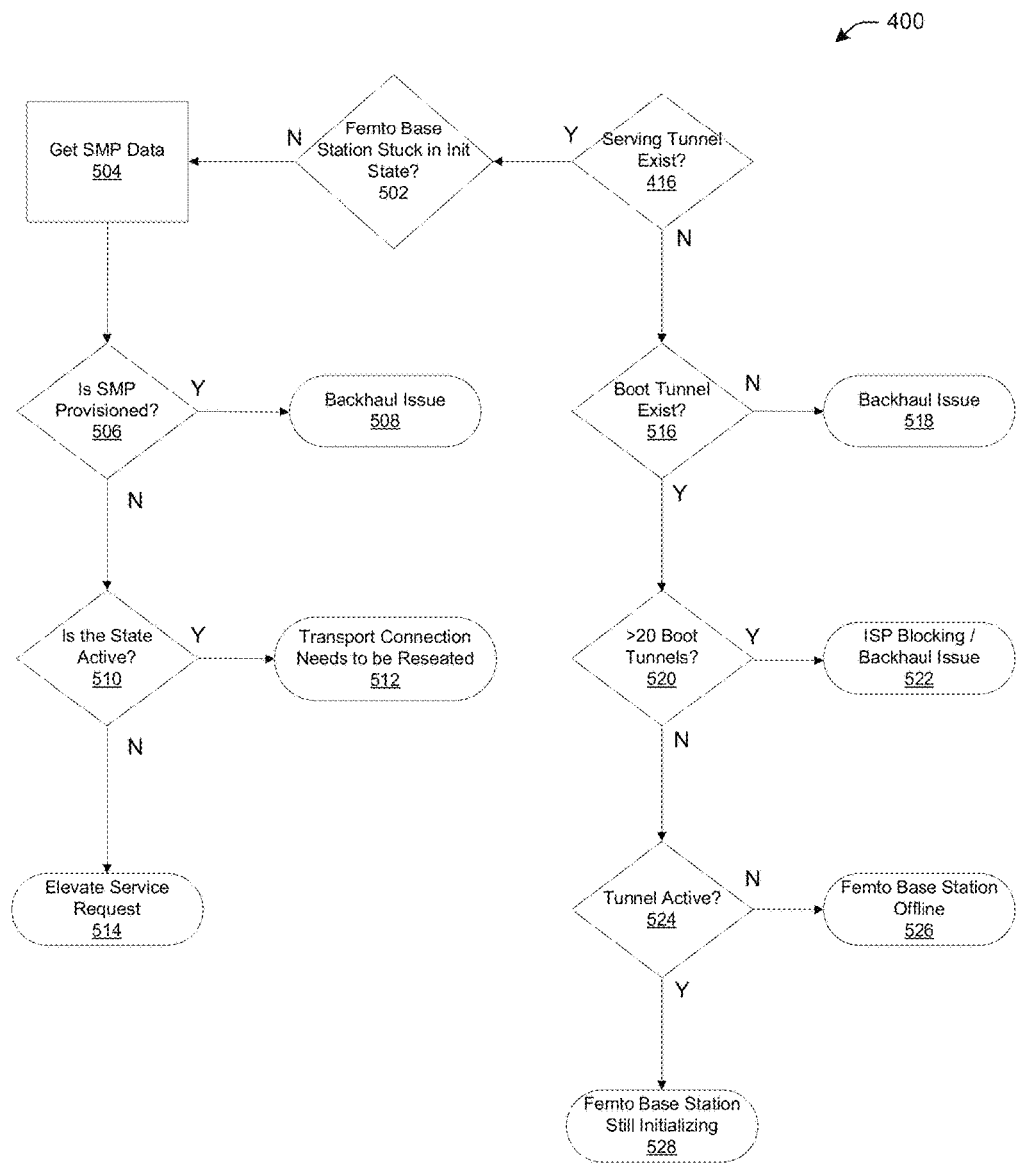
FIG. 5 illustrates a flow diagram as an example of a logic flow of a femtocell fault analysis tool.

FIGS. 4 and 5 illustrate example logic diagrams that the FA tool 134 may use in order to help predict or identify faults within the femtocell 102. The operations depicted in the logic diagrams may be entirely performed by modules residing within computer-readable memory 126 of the FA server 122, or may be performed by the FA server 122 in conjunction with additional gateways and servers within the infrastructure of the wireless carrier 100, such as the femtocell gateway 112, the femtocell manager 114, the AAA server 116, the OSS/FS gateway 118, and the SMP gateway 120, among others.

Not all of the operations need be present or in the order in which they are depicted. The logic diagrams of FIGS. 4 and 5 are for example purposes only to illustrate one possible method for predicting IP backhaul 106 faults in a femtocell 102 network. For illustration purposes, the following description will assume that the logic operations are programmed onto the FA server 122 and are accessible through the FA tool 134.

FIG. 4 illustrates a fault prediction system 400 that embodies logic described herein to predict network faults. At block 402, the femto base station 104 ID is retrieved. The femto base station 104 ID may be a serial number associated with the femto base station 104 or may be some other unique identifier. It may be retrieved from a database having information associated with a subscriber, it may alternatively be provided by a subscriber, for example, by entering the information into a user interface of the FA tool 134.

The FA tool 134 may then retrieve tunnel information at block 404. The tunnel information may include information regarding the tunnels established or renewed by the femto base station 104 of interest, and may be organized in an array or a database structure. The tunnel information may additionally include timestamp information associated with each tunnel information entry to allow the FA tool 134 to further refine and filter the tunnel information by the relevant timestamp.

At block 406, the latest tunnel information is determined, such as, for example, by filtering out the tunnel information that is older than the previous 8, hours, 12 hours, 24 hours, or some other desired time period. The result is that only the most recent tunnel information is provided to the FA tool 134 to reduce the memory and processing cycles required to analyze the subset of tunnel information.

At block 408, the system 400 parses the tunnel information and determines whether there is a tunnel reported. If there is no reported tunnel in the tunnel information, then the logic flows to block 410 and the system predicts that there is a communications issue with the femto base station 104 and that it cannot communicate with the wireless carrier 100 network. The system may return a message indicating that there is a likely issue with the connection of the femto base station 104 to the subscriber's ISP, which may indicate an IP backhaul issue.

At block 412, if the system 400 determines that there is a tunnel reported at block 408, the system 400 extracts the tunnel information. This may be accomplished, for example, by parsing the tunnel information and extracting the data indicative of the boot tunnel, init tunnel, and serving tunnel information from an array containing all the tunnel information.

At block 414, the extracted tunnel information is analyzed and categorized to identify, among other things, the types of tunnels that are established.

At block 416, the system 400 determines the latest tunnel and further determines whether the latest tunnel is a serving tunnel. If there is no serving tunnel, then the logic proceeds to the logic diagram illustrated in FIG. 5. If there is a serving tunnel, then the system 400 determines, at block 418, whether the serving tunnel is active.

If the system 400 determines that the serving tunnel is not active, then at block 420, the system 400 may return a message indicating that the femtocell 102 was provisioned properly and may have lost connection to the network and to check the power and data cable of the femto base station 104.

If the system 400 determines that there is an active tunnel, at block 422, the system 400 retrieves the data from the femtocell manager 114. The data from the femtocell manager 114 will indicate, among other things, whether the femtocell manager 114 was provisioned.

At block 424, the system 400 determines whether the femtocell manager 114 was provisioned properly. If the femtocell manager 114 was not provisioned, then the system 400, at block 426, determines whether the SMP gateway 120 was provisioned properly. If the SMP gateway 120 was not provisioned, then the system 400 determines that there were provisioning issues during the initial setup of the femtocell 102 and returns an indication that there are provisioning issues 428 and the provisioning steps may need to be repeated.

If the system 400 determines that the SMP gateway 120 was properly provisioned, then the system 400 returns a message indicating that the SMP gateway 120 and the femtocell manager 114 may need to be synchronized 430. In some instances, the FA tool 134 may issue instructions to the femtocell manager 114 and/or the SMP gateway 120 to synchronize with each other, thereby automatically resolving the likely issue with the femtocell 102 network.

Returning to block 424, if the system 400 determines that the femtocell manager was provisioned, at block 432, the system 400 retrieves data from the femto base station 104. The data from the femto base station 104 will include data indicating, among other things, whether the femto base station 104 was properly provisioned during the setup process.

At block 434, the system 400 parses the data from the femto base station 104 and determines whether the femto base station was properly provisioned. If the system 400 determines that the femto base station 104 was not properly provisioned, then the system 400 returns an indication that the femtocell manager 114 and the femto base station 104 need to synchronize with one another 436. The system 400 may issue a command to the femtocell manager 114 and/or the femto base station 104 to synchronize thereby automatically resolving the likely issue with the femtocell 102. If, however, the system 400 determines that the femto base station 104 was properly provisioned, then the system 400 may return an indication that the provisioning process is still in progress 438.

FIG. 5 continues the logic operations depicted in FIG. 4 and begins with a reproduction of block 416 in which the system 400 determines whether a serving tunnel exists. FIG. 5 shows additional logic that the system 400 may follow if the system 400 determines that there is a latest tunnel and that the latest tunnel is a serving tunnel.

At block 502, the system 400 determines whether the femto base station 104 is stuck in an initialization state. This may be performed, for example, by determining a number of active tunnels and if it is determined that there are a relatively large number of tunnels, such as greater than about forty tunnels, for example, then the system 400 may send a command to the femto base station 104 to reboot or reinitialize in an attempt to get out of the initialization loop.

At block 504, the system 400 may retrieve the SMP gateway 120 data, which may include, among other things, provisioning data associated with the SMP gateway 120. If the system determines that the SMP gateway 120 is properly provisioned, then at block 508, the system returns an indication that there is likely an IP backhaul issue or an issue with subscriber or ISP hardware, such as a router or modem that is preventing the femto base station 104 from connecting to the internet through the ISP of the subscriber.

At block 510, if the system 400 determines that the SMP gateway 120 was properly provisioned, then the system determines whether the state of the SMP gateway 120 has marked the femtocell device as active. If the system 400 determines that the state is already active, then at block 512, the system 400 predicts that the transport connection needs to be reset, and the system 400 may issue a command to automatically reset the transport connection.

If the system 400 determines that the SMP gateway 120 was not properly provisioned at block 506, then at block 514, a service request is elevated to engineering support for additional troubleshooting. The system 400 therefore determines that the fault within the femtocell 102 network is not able to be diagnosed quickly by the subscriber, but rather, may require additional technical resources from the wireless carrier in order to properly diagnose and solve the communication issues with the femtocell 102 network.

With continued reference to FIG. 5, returning again to block 416, if the system 400 determines that a serving tunnel does not exist, then the system 400 determines whether a boot tunnel exists at block 516. If a block tunnel does not exist, then the system 400 determines, at block 518, that there is a likely issue with the IP backhaul 106 and that the subscriber needs to contact the ISP to troubleshoot the IP backhaul issue. Alternatively, the issue may reside with the modem or router at the subscriber's location. In any event, the issue is not likely with the femto base station 104 or any equipment maintained by the wireless carrier 100.

If the system 400 determines that a boot tunnel exists, then at block 520, the system 400 determines whether there are a number of tunnels greater than a threshold, such as greater than twenty boot tunnels. If the number of active boot tunnels is greater than a threshold amount, then the system 400 returns an indication that there is likely an issue with the ISP blocking data packets, such as by blocking a specified port.

If the system determines, at block 520, that there are fewer than a threshold number of boot tunnels, then the system determines, at block 524, whether there is an active boot tunnel. If the system determines that there is not an active boot tunnel, then the system, at block 520, returns an indication that the femto base station 104 is likely offline and the subscriber should verify that the femto base station 104 is turned on and connected to the IP backhaul 106.

If the system determines, at block 524, that there is an active boot tunnel, then the system returns an indication that the femto base station 104 is still initializing.

The described logic flow illustrates some examples of decisions and predictions that the system 400 can make based upon the data provided by the log files. As described herein, the log files may contain provisioning data, tunnel data, packet data, and other information that the system 400 may be able to use to determine the likely issues affecting the femtocell 102 network.

Figure 6:
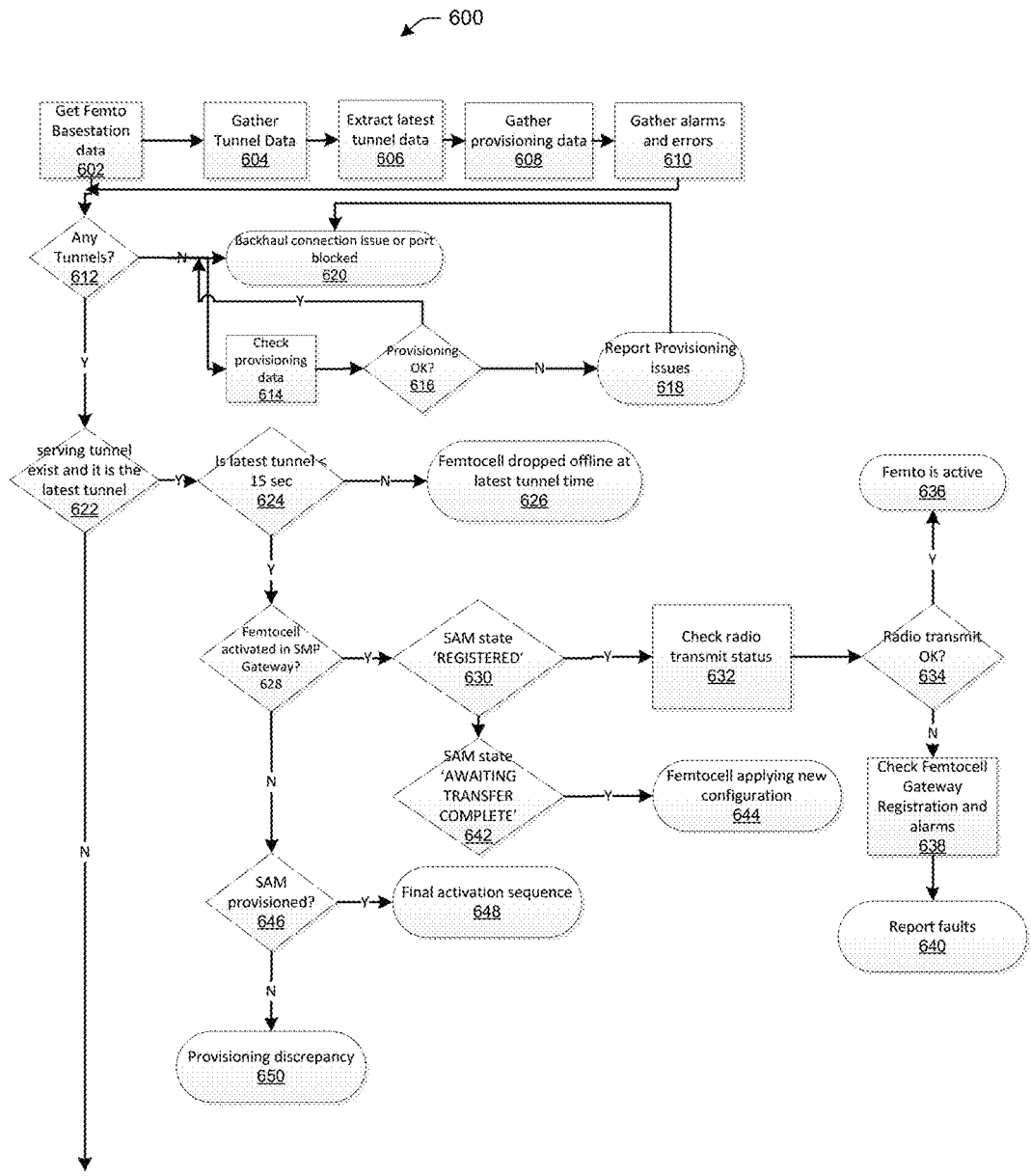
FIG. 6 illustrates a flow diagram as an example of a logic flow of a femtocell fault analysis tool.

FIG. 6 illustrates an example of a fault prediction system 600 that embodies logic described herein to analyze network faults. At block 602, the FA tool 134 may retrieve the femto base station 104 data that may include an identification of the specific femto base station 104 of interest. In addition to the femto base station data, the tunnel data is gathered at block 604. The tunnel data my include data representing communication connections to and from the femto base station 104. At block 606, the latest tunnel data is extracted. For example, the tunnel data may be filtered to show only the most recent four or twelve hours of tunnel data.

At block 608, the provisioning data is gathered, which may indicate that the femtocell 102 and all the required nodes, were properly provisioned and ready to initiate a connection with the wireless carrier 100. At block 610, the errors and alarms data is gathered, which may indicate any possible issues with the femtocell 102.

At block 612, the tunnel data is analyzed to determine whether there are any tunnels reported. If there are no tunnels being reported, this may be an indication that there is a backhaul connection problem, such as a blocked port, at block 620. The logic continues at block 614 to check the provisioning data to ensure that the femtocell 102 was provisioned. If the provisioning data checks out, at block 616, an error is reported that there is likely an issue with the backhaul. If there are errors with the provisioning data, at block 618, the provisioning issues are reported.

Returning to block 612, if there are reported tunnels, at block 622 the system determines whether there is an active serving tunnel and whether it is the latest tunnel. If there is an active serving tunnel, the system determines whether the latest tunnel is recent, such as newer than about fifteen seconds, at block 624. Of course, another time period may be utilized as a threshold. If the system determines that the latest tunnel is not more recent than a predetermined threshold, at block 626, the system determines that the femtocell dropped offline at the latest tunnel time and may report that this is the case.

Returning to block 624, if the latest tunnel is newer than a predetermined threshold, such as about fifteen seconds, then the system determines whether the femtocell 102 is activated in the SMP Gateway 120. If the femtocell appears to have been activated in the SMP Gateway, at block 630, the system determines whether the SAM state of the femtocell 102 acknowledges that the femtocell 102 is "registered." If the femtocell 102 is designated as registered, at block 632, the radio transmit status of the femtocell 102 is checked. If, at block 634, the radio transmit status of the femtocell 102 is OK, then at 636, the system determines that the femtocell is active. If, however, the radio transmit status of the femtocell 102 is not functioning as expected, then at 638, the femtocell 102 gateway 112 registration and alarms are analyzed for possible faults or errors, and the faults are reported at block 640.

Returning to block 630, if the SAM state does not indicate that the femtocell 102 is "registered," but rather, indicates, at block 642, that the femtocell 102 is awaiting transfer to be complete, then the system reports, at block 644, that the femtocell is applying a new configuration and should be operational soon.

Returning to block 628, if the femtocell 102 has not been activated in the SMP gateway 120, then the system determines, at block 646, whether the SAM was properly provisioned. If so, then the system responds that the femtocell 102 is in its final activation sequence, at block 648. If the system determines, at block 646, that the SAM was not properly provisioned, then the system determines that there is a provisioning discrepancy, at block, 650, and responds accordingly.

Returning to block 622, if the system 600 determines either that (i) the serving tunnel does not exist, or that (ii) the serving tunnel is not the latest tunnel, then the system proceeds to analyze the init tunnel data.

Figure 7:
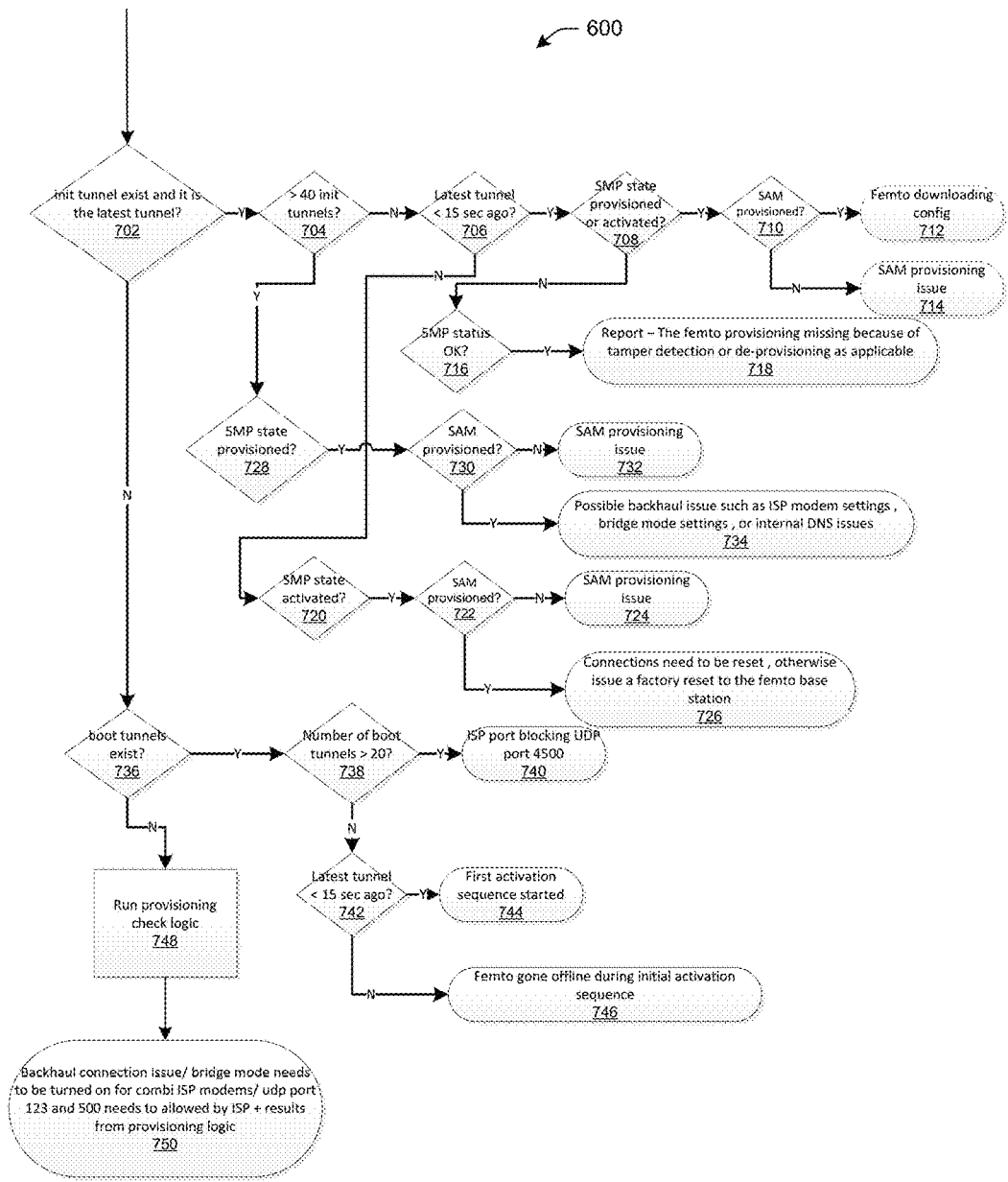
FIG. 7 illustrates a flow diagram as an example of a logic flow of a femtocell fault analysis tool.

With reference to FIG. 7, continuing from FIG. 6, the init tunnel data is analyzed at block 702. If the system determines that there is an active init tunnel and that it is the latest tunnel, at block 704, the system 600 determines whether there are a number of init tunnels greater than a predetermined threshold, such as about forty init tunnels. If there are fewer than the predetermined number of init tunnels, then at block 706, the system analyzed the init tunnels to determine whether the latest tunnel is more recent than a threshold value of time, such as fifteen seconds in some embodiments. Of course, other threshold values of time can be used in other embodiments. If the latest init tunnel is more recent than a predetermined threshold value of time, then, at block 708, the system 600 determines whether the SMP was properly provisioned and activated. If the SMP was properly provisioned and activated, at block 710, the system 600 determines whether the SAM was properly provisioned. If the SAM appears to have been properly provisioned, that at block 712, the system reports that the femto base station 104 is downloading and/or applying the latest configuration; otherwise, at block 714, the system responds that there is a likely SAM provisioning issue.

Returning to block 708, if the system 600 determines that the SMP was not properly provisioned or activated, than at block 716, the SMP status is checked and if it appears to be operating normally, then the system 600 may report, at block 718, that there is a tamper alarm or other issue that affected the femtocell 102 provisioning.

Returning to block 706, if the latest tunnel is older than a predetermined threshold value of time, then at block 720, the system determines whether the SMP state reports as active. If the SMP status is active, then at block 722, the system 600 determines whether the SAM was provisioned. If the system 600 determines that the SAM was not properly provisioned, then at block 724, the system reports that there was an error with the SAM provisioning; otherwise, at block 726, the system responds that the connections need to be reset, or in the alternative, and maybe as an escalation procedure, issue a factory reset to the femto base station 104. The factory reset command may be issued automatically by the system 600, or a prompt may be provided to another device or user of the system 600 that this is the recommended course of action.

Returning to block 704, if the system 600 determines that there are a greater number of init tunnels than a predetermined threshold, such as forty tunnels, then at block 728, the system 600 determines whether the SMP was provisioned. If the SMP was properly provisioned, then at block 730, the system determines whether the SAM was provisioned. If the SAM was not provisioned appropriately, then the system 600 reports that there is a SAM provisioning issue at block 732; otherwise, at block 734, the system reports that there may be a backhaul issue, such as with modem settings or DNS issues with equipment not under the control of the wireless carrier 100.

Returning to block 702, if the system 600 determines either that (i) an init tunnel does not exist, or (ii) the init tunnel is not the latest tunnel, then at block 736, the system 600 determines whether a boot tunnel exists. If a boot tunnel exists, at block 738, the system 600 analyzes the boot tunnel logs to determine whether there are a greater number of boot tunnels than a predetermined threshold value, such as twenty boot tunnels. If there are a number of boot tunnels exceeding the predetermined threshold, then at block 740, the system reports that there may be an issue with the ISP of the subscriber blocking ports, such as UDP port 4500.

If the system 600 determines that a number of existing boot tunnels is lower than a threshold number, then the system 600 determines whether the latest boot tunnel is more recent than a threshold value, such as about fifteen seconds. If the system 600 determines that the latest boot tunnel is newer than the predetermined value, then the system reports, at block 744, that the first activation sequence is started; otherwise, at block 746, the system 600 reports, at block 746, that the femtocell 102 went offline during the activation sequence.

Returning to block 736, if the system 600 determines that a boot tunnel does not exist, at block 748 the system runs an analysis of the provisioning check logic to reports, at block 750, that there is a backhaul connection issue, such as, for example, that the bridge mode should be activated for a modem of the subscriber, UDP ports 123 and 500 need to be allowed by the ISP of the subscriber.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method for determining IP backhaul issues in a femtocell network, the method comprising:
    receiving femto device provisioning data indicating that a femto device was provisioned;
    receiving tunnel data indicating a list of tunnels initiated by the femto device;
    receiving femto manager provisioning data indicating that a femto manager was provisioned;
    receiving service management platform (SMP) gateway provisioning data indicating that an SMP gateway was provisioned;
    analyzing the tunnel data, femto device provisioning data, femto manager provisioning data, and SMP gateway provisioning data; and
    based at least in part on the analyzing, determining that a fault in the femtocell network is with an IP backhaul.

2. The method for determining IP backhaul issues as recited in claim 1, further comprising receiving a unique identifier of the femto device.

3. The method for determining IP backhaul issues as recited in claim 1, wherein receiving the tunnel data includes receiving a tunnel array from an authentication, authorization, and accounting (AAA) server and further comprises removing tunnel data older than a predetermined threshold to result in recent tunnel data.

4. The method for determining IP backhaul issues as recited in claim 3, further comprising determining that there is no active tunnel, and determining that the fault in the femtocell network is with the IP backhaul is based at least in part upon determining that there is no active tunnel.

5. The method for determining IP backhaul issues as recited in claim 1, wherein determining that the fault in the femtocell network is with the IP backhaul is performed after determining that there are no faults with the femto device provisioning, femto manager provisioning, or the SMP gateway provisioning.

6. The method for determining IP backhaul issues as recited in claim 1, wherein the list of tunnels initiated by the femto device includes more than one boot tunnel, and determining that the fault in the femtocell network is with the IP backhaul is based at least in part upon the number of boot tunnels being above a threshold.

7. A non-transitory computer-readable medium having executable instructions stored thereon that, when executed by a computing device, cause the computing device to perform operations comprising:
    receive femto base station data identifying a femto base station;
    receive tunnel data indicating one or more tunnels initiated by the femto base station;
    extract latest tunnel data by filtering the tunnel data based at least in part upon a time threshold;
    establish communication with a femtocell gateway and receive femtocell gateway provisioning data;
    establish communication with a femtocell manager and receive femtocell manager provisioning data;
    establish communication with a SMP gateway and receive SMP gateway provisioning data;
    execute a fault prediction module to analyze one or more of the latest tunnel data, the femtocell gateway provisioning data, the femtocell manager provisioning data, and the SMP gateway provisioning data; and
    determine that the fault is with an IP backhaul associated with the femto base station based at least in part upon a determination that the fault is not with the femto base station, the femtocell gateway, the femtocell manager, or the SMP gateway.

8. The non-transitory computer-readable medium of claim 7, wherein the fault with the IP backhaul is determined, at least in part upon a determination that the latest tunnel data indicates that there is not an active tunnel.

9. The non-transitory computer-readable medium of claim 7, wherein the fault with the IP backhaul is determined, at least in part, upon a determination that the latest tunnel data indicates that a number of boot tunnels is above a threshold.

10. The non-transitory computer-readable medium of claim 7, wherein the fault with the IP backhaul is determined, at least in part, upon a determination that the tunnel data indicates a serving tunnel initiated by the femto base station, but the serving tunnel is no longer active.

11. The non-transitory computer-readable medium of claim 7, wherein the operations further comprise creating a graphical user interface for presentation on a display, the graphical user interface configured to receive an identification of a femto base station through a user input to the graphical user interface.

12. The non-transitory computer-readable medium of claim 11, wherein the operations further comprise outputting information to the graphical user interface indicating that the fault is with the IP backhaul.

13. The non-transitory computer-readable medium of claim 7, wherein the fault with the IP backhaul is determined, based at least in part, upon a determination that a serving tunnel was initiated and the SMP gateway was provisioned.

14. A system, comprising:
    memory;
    one or more processors;
    a tunnel module stored on the memory and executable by the one or more processors to receive tunneling data indicating tunnels established by a femto base station within a femtocell network;

an analysis module stored on the memory and executable by the one or more processors to analyze the tunneling data; and a fault prediction module stored on the memory and executable by the one or more processors to parse the tunneling data to determine a fault preventing the femto base station from communication with a wireless carrier network, wherein the tunnel module is further executable by the one or more processors to categorize the tunnel data to identify boot tunnel data, init tunnel data, and serve tunnel data.

15. The system as in claim 14, wherein the tunnel module is further executable by the one or more processors to filter the tunnel data based upon a predetermined time period.

16. The system as in claim 14, wherein the fault prediction module is executable by the one or more processors to determine that the fault is caused by an IP backhaul associated with the femto base station.

17. The system as in claim 16, wherein the fault is caused by an IP backhaul is determined, based at least in part, upon a determination that the tunneling data indicates there are no tunnels.

18. The system as in claim 16, wherein the fault is caused by an IP backhaul is determined, based at least in part, upon a determination that the tunneling data indicates a number of boot tunnels exceeding a threshold number of boot tunnels.

19. The system as in claim 16, wherein the fault is caused by an IP backhaul is determined, based at least in part, upon a determination that a serving tunnel has been established and that an SMP gateway has been provisioned.

\* \* \* \* \*